United States Patent

[11] 3,597,958

| [72] | Inventor | Maurice J. Gross<br>Rockford, Ill. |
|---|---|---|
| [21] | Appl. No. | 796,527 |
| [22] | Filed | Feb. 4, 1969 |
| [45] | Patented | Aug. 10, 1971 |
| [73] | Assignee | Rock-Mill, Inc.<br>Rockford, Ill. |

[54] MACHINE FOR REMOVING THE BEAD FROM THE JOINT OF A WELDED RAILWAY RAIL
17 Claims, 19 Drawing Figs.

[52] U.S. Cl. .................................................. 72/331,
72/407, 29/33 A, 83/914
[51] Int. Cl. ....................................................... B21d 31/00,
B21d 7/06, B21b 13/00
[50] Field of Search........................................... 72/331,
407, 325; 29/33.1; 219/97; 83/914; 90/24.05

[56] References Cited
UNITED STATES PATENTS

| 2,806,345 | 9/1957 | Phares | 83/914 X |
| 2,945,117 | 7/1960 | Harris | 83/914 X |
| 3,096,612 | 7/1963 | Coffey | 83/623 |

Primary Examiner—Charles W. Lanham
Assistant Examiner—R. M. Rogers
Attorney—Wolfe, Hubbard, Voit & Osann

ABSTRACT: Combined die and shearing members are shifted toward one another and into pressing engagement with opposite end faces of the bead to deform and reduce the cross section of the latter adjacent the joint while applying a compressive force to the rail to improve the quality of the weld at the joint. Thereafter, the members re shifted in unison in one direction along the rail to shear through the bead area of reduced cross section to cut the bead away from the rail. Finally, the members are retracted laterally away from the rail to tear the detached bead into two pieces and to pull the pieces away from the rail.

Patented Aug. 10, 1971

INVENTOR
Maurice J. Gross
By Wolfe, Hubbard, Voit & Osann
ATTORNEY

Patented Aug. 10, 1971

INVENTOR
Maurice J. Gross
By Wolfe, Hubbard, Voit & Osann
ATTORNEY

Patented Aug. 10, 1971

INVENTOR
Maurice J. Gross
By Wolfe, Hubbard, Voit & Osann
ATTORNEY

MACHINE FOR REMOVING THE BEAD FROM THE JOINT OF A WELDED RAILWAY RAIL

This invention relates generally to a machine for removing the flash or bead formed around the joint of two sections or railway rail which have been welded together end-to-end and, more particularly, to a machine for removing a bead of the type which is formed when the two rail sections are heated to extremely high temperatures and then butted together to produce the weld.

In recent years, many railroads have found it advantageous to replace short sections of rails with a continuous length of rail, sometimes more than one mile long, to avoid frequent interrupted joints between the rails and thereby produce a smoother ride. The continuous track is formed from either new or used short rail sections which are welded together end-to-end and linked rigidly to one another. With one type of welding operation, the rail sections are heated to very high temperatures until the ends become plastic, and then are forced together to fuse the ends to one another under the applied heat and pressure. Some of the metal at the rail ends is squeezed outwardly as the rails are forced together and forms an enlarged bead extending around the outer side of the rail at the joint. To raise the inner or central portions of the rail sections to a sufficiently high temperature to effect an acceptable bond between the central portions, the outer sides of the sections must be heated to considerably higher temperatures and, as a result, the metal at the outer sides often becomes so plastic or mushy that an extremely good pressure bond usually is not formed between the outer sides when the sections are forced together. Accordingly, the weld around the outer side of the joint is somewhat weaker than that at the center of the joint.

While the rails are still in a heated condition after being welded, the enlarged bead is removed from around the joint, usually by a shearing operation, to smooth out the joint. It has been found that conventional shearing of the bead from the rail impairs the quality of the weld between the sections and particularly around the weaker outer side of the joint since the shearing forces applied to the bead cause the weld to crack or open up around the outer side.

The primary aim of the present invention is to provide a new and improved machine which not only removes the bead without damaging the weld but which can actually improve the quality of the weld as an incident to taking off the bead.

Another object is to deform the bead to facilitate shearing of the latter from the rail and, at the same time, to apply a compressive force to the rail sections to press the sections together and enhance the bond around the outer side of the joint.

A further object is to decrease the shearing forces necessary to apply to the joint to remove the bead by first reducing the original cross section of the bead and then by shearing through the area of reduced cross section to cut the bead away from the rail.

Still another object of the invention is to provide a machine with which the bead is automatically torn into two or more pieces and pulled laterally off of the rail immediately after being sheared.

An additional object is to clamp the rail securely during the shearing operation without exerting bending stresses on the machine.

The invention also resides in the novel construction of and coaction between combined die and shearing members for deforming, shearing and tearing the bead, and in the unique mounting of such members to enable the performance of the various operations with a comparatively simple actuating mechanism.

A further object of the invention is to mount the members for vertical and lateral floating relative to the rail to enable the machine to operate on crooked rails.

Other objects and advantages of the invention will become apparent from the following detailed description when taken in conjunction with the accompanying drawings in which:

As shown in the drawings for purposes of illustration, the invention is embodied in a machine 20 for removing the flash or bead 21 (FIG. 2) from around the joint of two sections of railway rail that have been welded together end-to-end to form a single continuous rail 23. The exemplary rail is formed from several 39-foot sections and includes an upper ball 24 and a lower base 25 which are interconnected by an upright web 26.

To form the weld at the joint of the rail 23, the two short rail sections are flame-heated to a forging temperature, are butted together end-to-end, and are forced into pressing engagement with one another at forces ranging upwardly to 20 tons. The applied heat and pressure softens and fuses the metal at the ends of the sections to weld the sections rigidly to one another. As the sections are forced together, the softened metal at the joint is squeezed or upset outwardly, allowing bodily shifting of the sections toward one another through a distance as much as seven-eighths of an inch, and the excess metal flashes outwardly around the outer side of the joint to form the bead 21. It is necessary to heat the outer sides of the rail sections to extremely high temperatures in order that sufficient heat will be conducted to the inner or center zones of the sections to produce an adequate bond between the center zones. Thus, the outer sides become more plastic and flowable than the center zones and, when the rail sections are pushed together, less bonding pressure is exerted between and around the relatively mushy outer sides so that the weld around the periphery of the joint is somewhat poorer than that at the center of the joint.

After being welded and while still extremely hot, the rail 23 is fed to the machine 20 where the exterior bead 21 is removed from around the joint. Substantially the entire bead is removed so as to smooth out the top of the ball 24 and the bottom of the base 25 and to avoid leaving on the sides of the rail any relatively porous excess metal which would be attacked chemically while the rail is in service use.

According to the primary aspect of the present invention, the machine 20 removes the bead 21 without damaging the weld at the joint by first deforming the bead to reduce the original cross section of the latter adjacent the joint, and then by shearing through the area of reduced cross section to cut the bead away from the rail 23. As an incident to deformation of the bead, a compressive force pressing the rail sections together is exerted on the rail and results in the application of pressure to the weaker weld zone around the outer side of the joint so that such zone will not crack or open up when shearing forces are applied to the joint to cut away the bead. Indeed, I have found that the quality of the weld is often actually improved and that some of the original flaws in the weld are eliminated as a result of the compressive force applied in deforming the bead. Moreover, with the bead first reduced in cross section, shearing forces of lesser magnitude are applied to the rail as the bead is removed thus further decreasing the danger of the weld being cracked open.

To achieve the foregoing, the machine 20 includes two die sets disposed on opposite sides of the rail 23 with each set comprising a front die 29 and a rear die 30 which may be positioned along opposite end faces of the bead 21. Initially, the front and rear dies of each set are shifted lengthwise of the rail and toward one another into pressing engagement with opposite faces of the bead to deform and reduce the cross section of the bead while applying a compressive force to the rail to exert pressure on the outer weld zone and to keep the weld from cracking. Thereafter, the front dies are released from pressing engagement with the bead, and the rear dies are shifted past the bead to shear through the deformed area of reduced cross section and thus cut the bead away from the rail.

Figure 3:
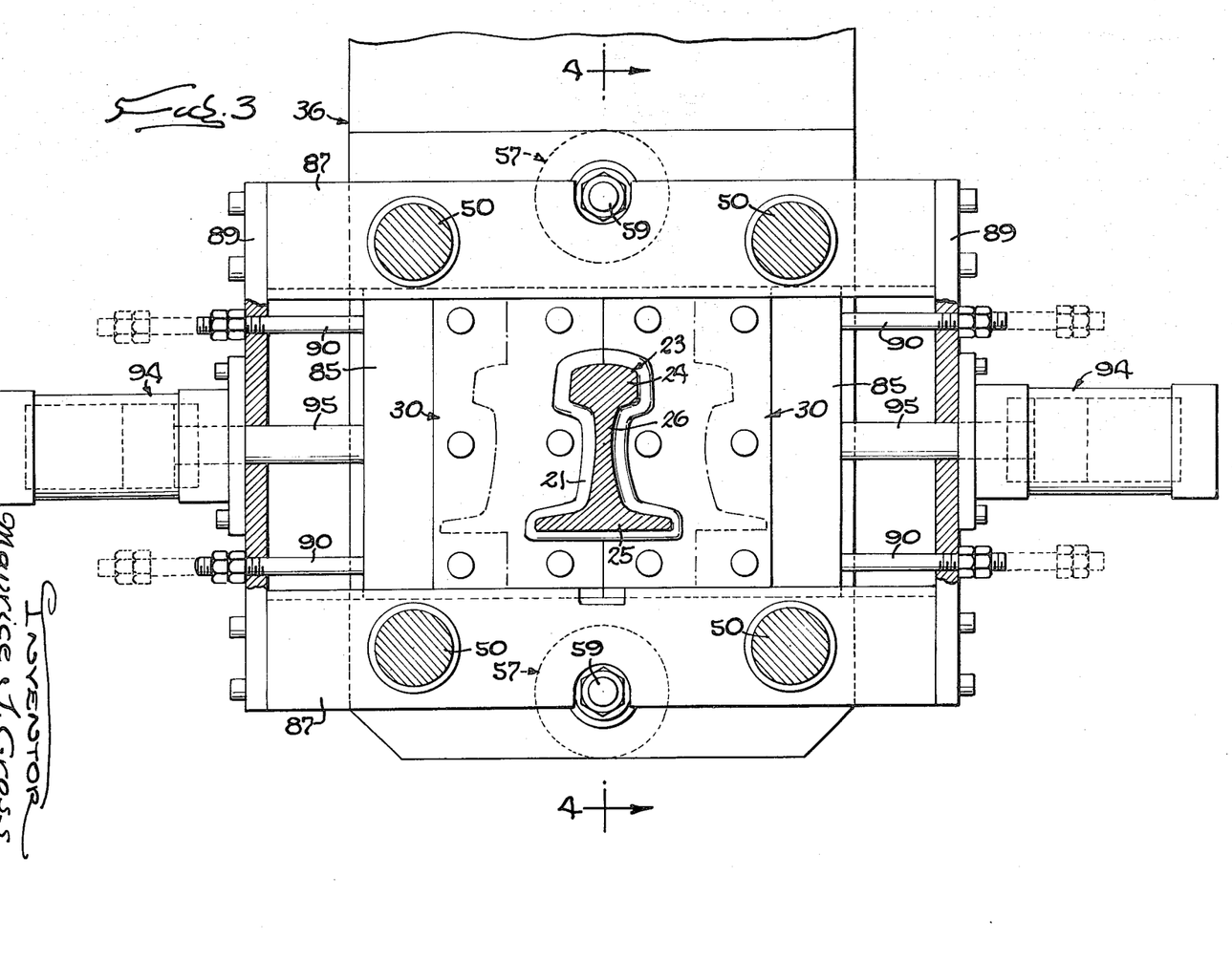
FIG. 3 is an enlarged fragmentary cross section taken substantially along the line 3-3 of FIG. 1.

More specifically, each of the dies 29, 30 herein is a generally flat steel block (see the die 29 shown in FIG. 4a) whose inner side is profiled to conform generally to the profile of the rail 23 as defined between the midpoint of the top of the ball 24 and the midpoint of the bottom of the base 25. The front and rear dies of each set directly oppose one another on opposite sides of the rail (see FIG. 3) and thus, when the dies are closed into engagement with the rail, the inner sides of the front dies extend around and embrace substantially the entire periphery of the rail on the forward face of the bead 21 while the inner sides of the rear dies similarly extend around and embrace the periphery of the rail on the rear face of the bead. Formed integrally around the inner side of each die and projecting from the face thereof and toward the bead is a formed edge portion 31 (FIG. 4a) which constitutes a combined deforming and shearing member. As shown most clearly in FIG. 7, each edge portion 31 includes an inner shearing edge 33 disposed alongside the rail, a deforming surface 34 extending outwardly from the shearing edge, and an outer relief surface 35 inclined away from the deforming surface and toward the adjacent face of the die. As will be explained more fully below, the edge portions 31 shear part of the bead from the rail and simultaneously deform the bead when the front and rear dies of each set are shifted toward each other and into pressing engagement with opposite faces of the bead.

Figures 1, 2:
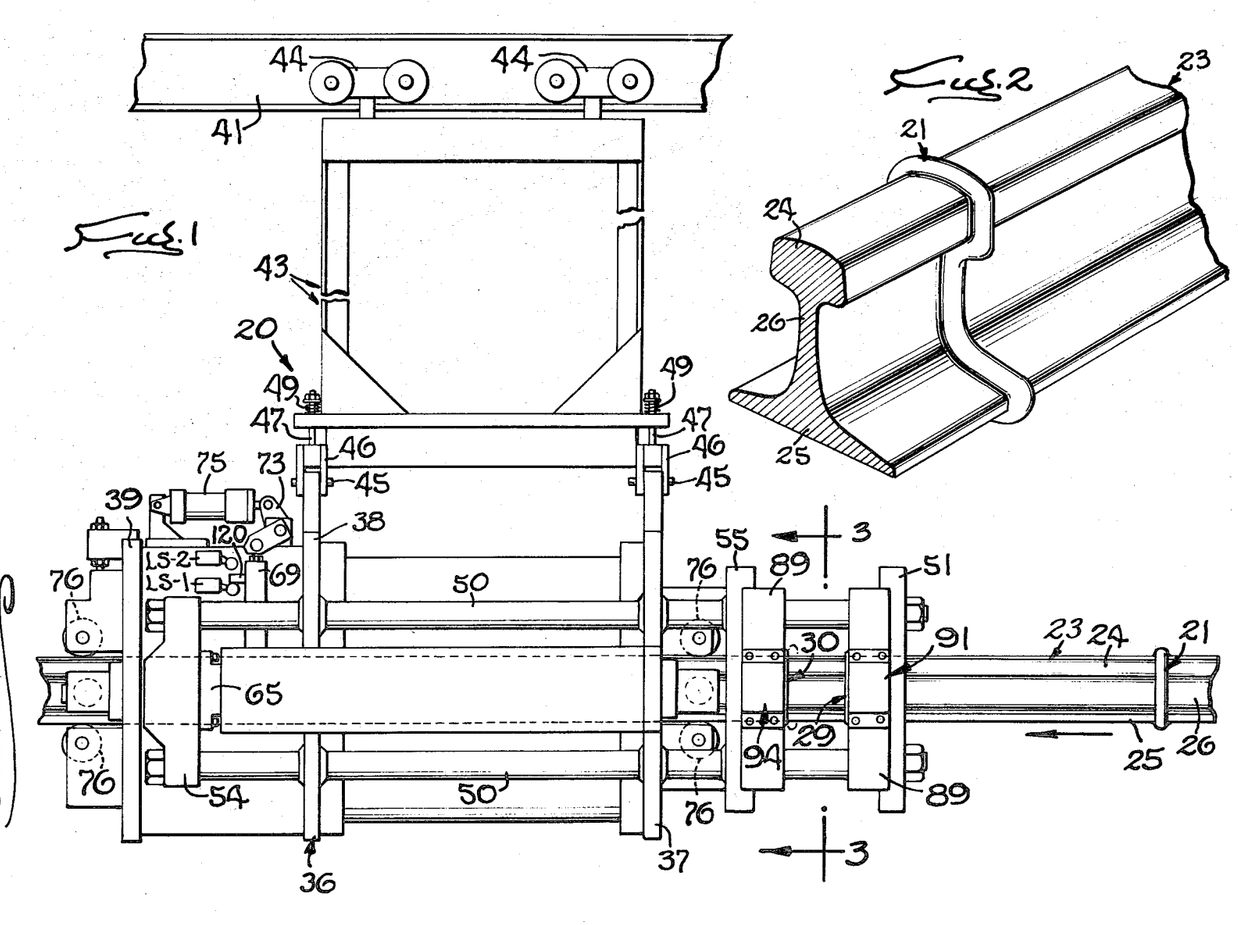
FIG. 1 is a fragmentary side elevation of a new and improved machine embodying the novel features of the present invention.
FIG. 2 is a fragmentary perspective view of two sections of railway rail welded end-to-end and showing the bead that is formed around the joint of the rail as an incident to the welding.

The dies 29 and 30 are carried by a subsupporting unit or carriage 36 which generally comprises three upright plates 37, 38 and 39 (FIGS. 1 and 4) spaced apart lengthwise of the rail 23 and rigidly interconnected to one another, the plates being formed with aligned central passages 40 (FIG. 4) through which the rail may be fed longitudinally relative to the machine 20. The carriage 36, in turn, is suspended from a main support which herein is a track in the form of an overhead I-beam 41 (FIG. 1) extending parallel to the rail and fixed stationarily above the latter. As shown in FIG. 1, a rectangular framelike trolley 43 is mounted to ride along the I-beam by sets of cars 44 and is advantageously connected to the plates 37 and 38 in such a manner as to allow the carriage 36 to float, both vertically and laterally with respect to the rail, so that crooked rails may be fed through the machine and between the dies without severe stresses being exerted on either the rail or the machine. In this instance, the plates 37 and 38 are connected pivotally by pins 45 (FIG. 1) to brackets 46 which are supported by rods 47 for up and down shifting on the lower end of the trolley, the brackets and plates being urged downwardly by coil springs 49 compressed between the rods and the trolley. With the foregoing arrangement, the carriage 36 may move with the trolley and lengthwise of the rail along the I-beam and also may float laterally and vertically relative to the trolley in order to accommodate any crooked rails which might be fed through the machine.

Figure 8:
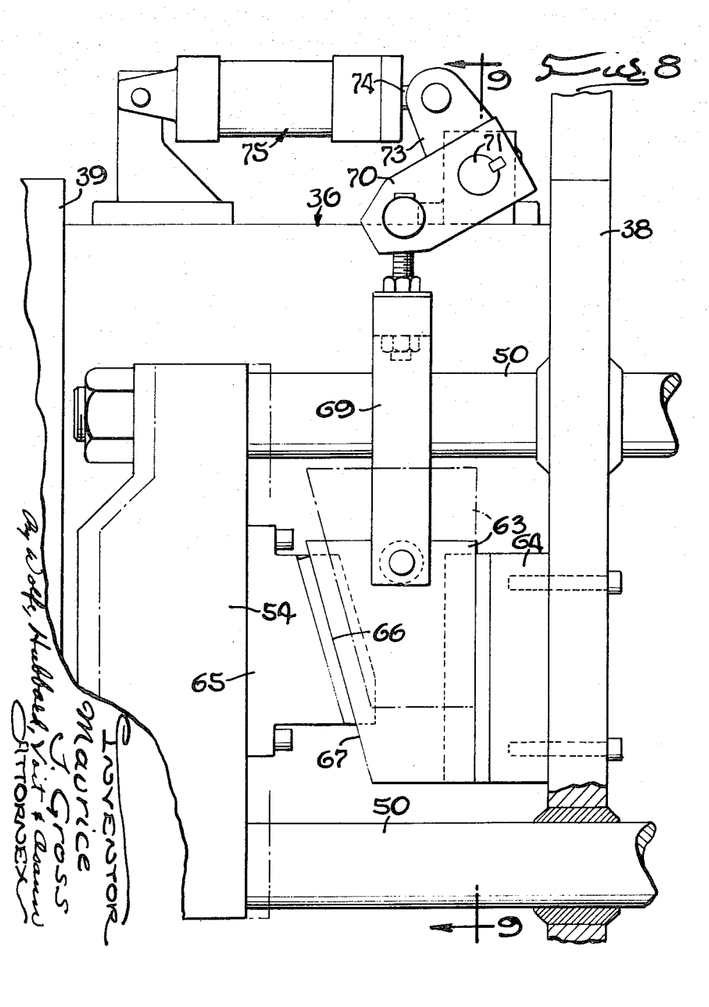
FIG. 8 is an enlarged view of parts illustrated in FIG. 1 and showing part of the supporting structure for the die and shearing members.

To mount the front dies 29 of each set for movement lengthwise of the rail 23 and toward and away from the bead 21, four parallel bars 50 (FIGS. 1,3 and 10) spaced from one another around the corners of a square are bushed slidably in the carriage plates 37 and 38 and are connected rigidly at their forward ends to a platelike front die support 51 which carries both front dies and which is formed with a central opening 53 (FIG. 5) for the rail. At their rear ends, the bars are interconnected by and anchored to a block 54 (FIGS. 1, 8 and 10) which is disposed between the plates 38 and 39. By sliding the bars back and forth relative to the plates 37 and 38, the forward die support 51 and the front dies 29 may be moved toward and away from the bead independently of the carriage 36.

Both rear dies 30 are mounted for movement along the rail 23 and relative to the carriage 36 and the front dies 29 on a platelike rear die support 55 (FIG. 4) which is slidable on the bars 50 and which is formed with a central opening 56 for receiving the rail. Advantageously, both the front and rear dies of the two sets are adapted to be shifted along the rail, first in opposite directions and then in the same direction, by a single pair of hydraulic die operators or actuators 57 which include reciprocating piston rods 59 whose forward ends are connected to the rear die support 55. At their opposite ends, the piston rods are anchored to pistons 60 which are slidable back and forth in cylinders 61 in response to the admission of pressure fluid alternately into opposite ends of the cylinders. As shown most clearly in FIG. 4, the cylinders are fastened rigidly between the carriage plates 37 and 38 and are centered relative to the rail with one cylinder disposed above and the other cylinder disposed below the rail. By extending and retracting the piston rods, the rear dies may be moved forwardly toward and rearwardly away from the bead 23 and, upon extension of the rods, the front dies first are shifted rearwardly into pressing engagement with the bead and then are shifted forwardly in unison with the rear dies.

Figure 9:
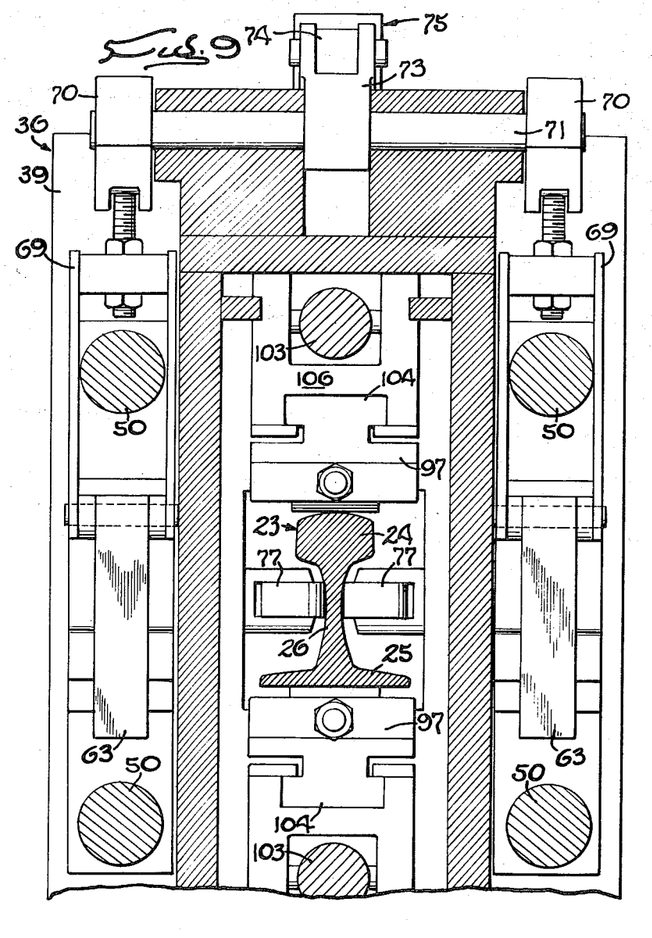
FIG. 9 is a fragmentary cross section taken substantially along line 9-9 of FIG. 8.

To cause sequential rearward and forward shifting of the front dies 29 as an incident to extension of the piston rods 59, the front die support 51 is adapted first to be locked for movement in unison with the carriage 36 and then is adapted to be unlocked from the carriage so as to be free to move relative to the latter. For these purposes, two wedges 63 (FIGS. 8 and 9) are mounted on the carriage and are movable between positions coupling and uncoupling the carriage plate 38 and the block 54 on the rear ends of the bars 50. When the plate and the block are coupled, rearward movement of the carriage 36 is transmitted to the block 54 through the wedges and acts to shift the block and the front die support 51 rearwardly along with the carriage. When the wedges are in their uncoupling positions, the block is free to move forwardly relative to the carriage plate 38 to allow sliding of the bars within the plates 37 and 38 and thereby permit forward movement of the front die support 51 relative to the carriage.

More particularly, the locking wedges 63 are disposed on opposite sides of the rail 23 near the rear end portion of the carriage 36 (see FIGS. 8 and 9) and are adapted to be forced vertically between a set of shoes 64 on the carriage plate 38 and an opposing of shoes 65 on the block 54, the latter shoes being formed with vertically inclined faces 66 which may be positioned in mating engagement with correspondingly inclined faces 67 on the wedges. At their upper ends, the wedges are connected to clevices 69 which, in turn, are connected pivotally to cranks 70 fast on the ends of a rock shaft 71. The latter is journaled for turning on the carriage 36 and carries an upwardly extending crank 73 which is connected to the piston rod 74 of a hydraulically operated wedge actuator 75. When the piston rod 74 is retracted, the shaft 71 is rocked counterclockwise to force the wedges 63 downwardly to their coupling positions (see FIGS. 8 and 10) between the shoes 64 and 65 so that any rearward movement of the carriage plate 38 will be transmitted to the block 54 and, through the bars 50, will be transmitted to the front die support 51 to shift the latter rearwardly. Also, downward movement of the wedges will shift the front die support 51 rearwardly relative to the carriage until the wedges reach their coupling positions between the shoes. Upon extension of the piston rod 74, the wedges are shifted upwardly relative to the shoes to their uncoupling positions (as shown schematically in FIG. 11 and in phantom in FIG. 8) and allow limited forward movement of the block 54 and the forward die support 51 relative to the carriage 36.

Figure 4:
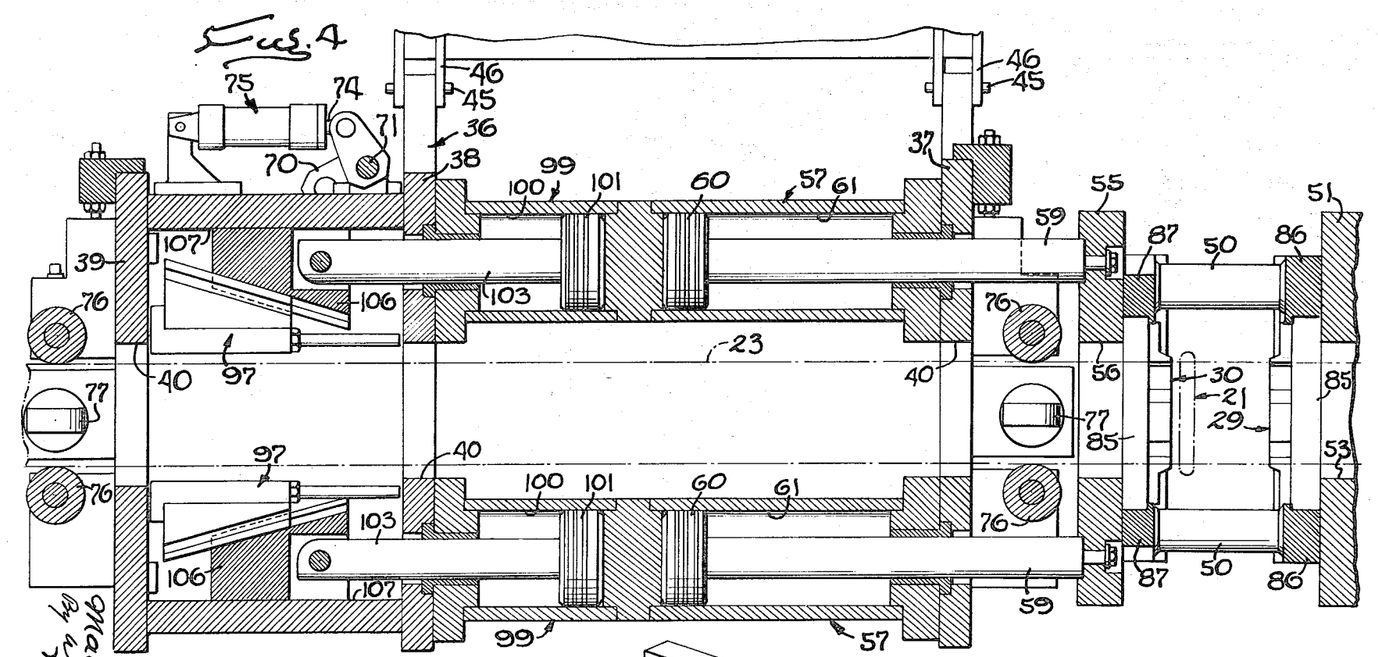
FIG. 4 is a fragmentary cross section, on a reduced scale, taken substantially along the line 4-4 of FIG. 3.
Figure 4A:
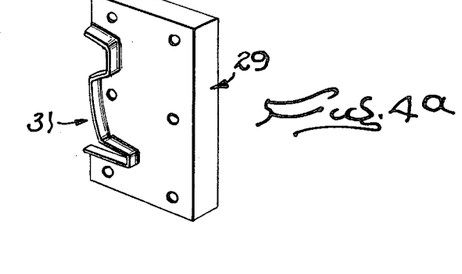
FIG. 4a is a fragmentary perspective view of one of the combined die and shearing members.

In removing the bead 21 with the machine 20 as described thus far, the rail 23 is fed rearwardly relative to the machine and through the various openings 40, 53, and 56 until the bead is positioned in close proximity to the rear dies 30 (see FIG. 4). During such feeding, the rail is guided by spring-biased upper and lower rollers 76 and by retractible side rollers 77 (FIG. 9) which are journaled rotatably on the carriage 36. Being suspended for vertical and lateral floating from the trolley 43, the carriage is free to shift in a substantially universal manner to accommodate any crookedness in the rail as the latter is fed between the rollers.

Figure 5:
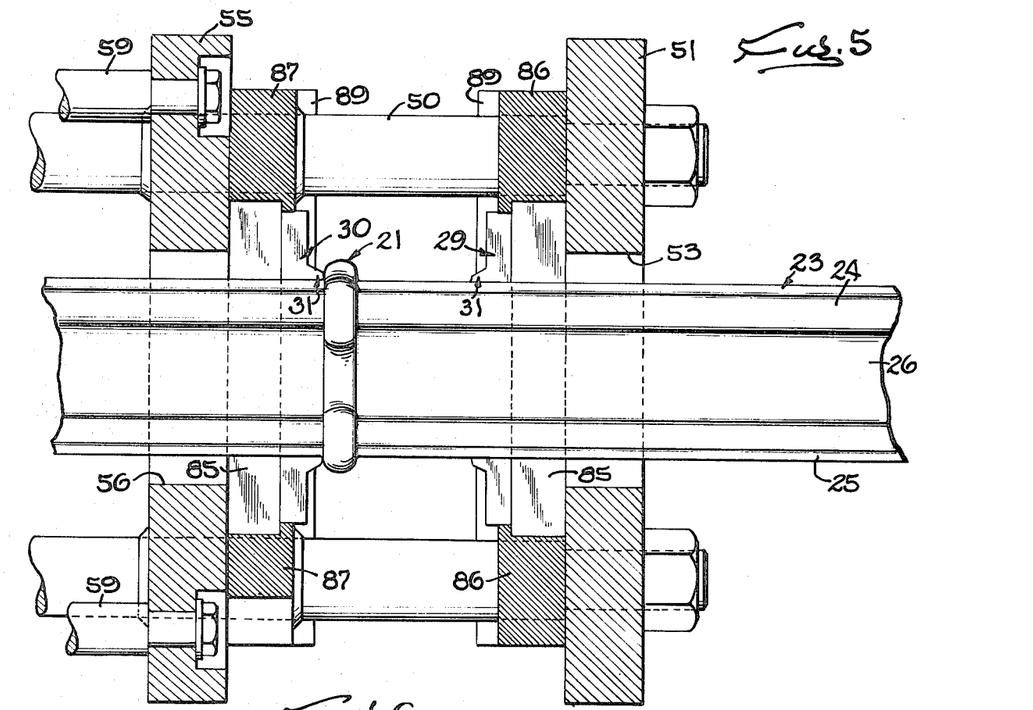
FIG. 5 is an enlarged view of the combined die and shearing members illustrated in FIG. 4 and showing one of the members in a moved position.

With the front and rear dies 29 and 30 of each set embracing the rail 23 and with the locking wedges 63 disposed in their coupling positions (FIG. 10), pressure fluid is admitted into the head ends of the cylinders 61 of the die actuators 57 to extend the piston rods 59 and to shift the rear die support 55 and the rear dies 30 forwardly relative to the carriage 36 and into engagement with the rear face of the bead 21 (see FIG. 5). Forward movement of the rear dies continues until the dies are stopped by engagement with the bead. Then, with a continued buildup of pressure in the head ends of the cylinders 61, the entire carriage is shifted rearwardly relative to the rear dies, the carriage sliding rearwardly along the piston rods 59 and moving the trolley 43 rearwardly along the overhead I-beam 41 during such shifting. In other words, the reaction force exerted against the head ends of the cylinders as a result of pressurization of the cylinders with the rear dies stopped against the bead causes the carriage to shift rearwardly on the I-beam and along the rail 23. Since the carriage plate 38 is locked to the block 54 by the wedges 63, the block, the bars 50 and the front die support 51 are shifted rearwardly with the carriage and pull the front dies 29 rearwardly into pressing engagement with the forward face a of the bead such that the latter becomes pinched between the front and rear dies.

Figures 6, 7:
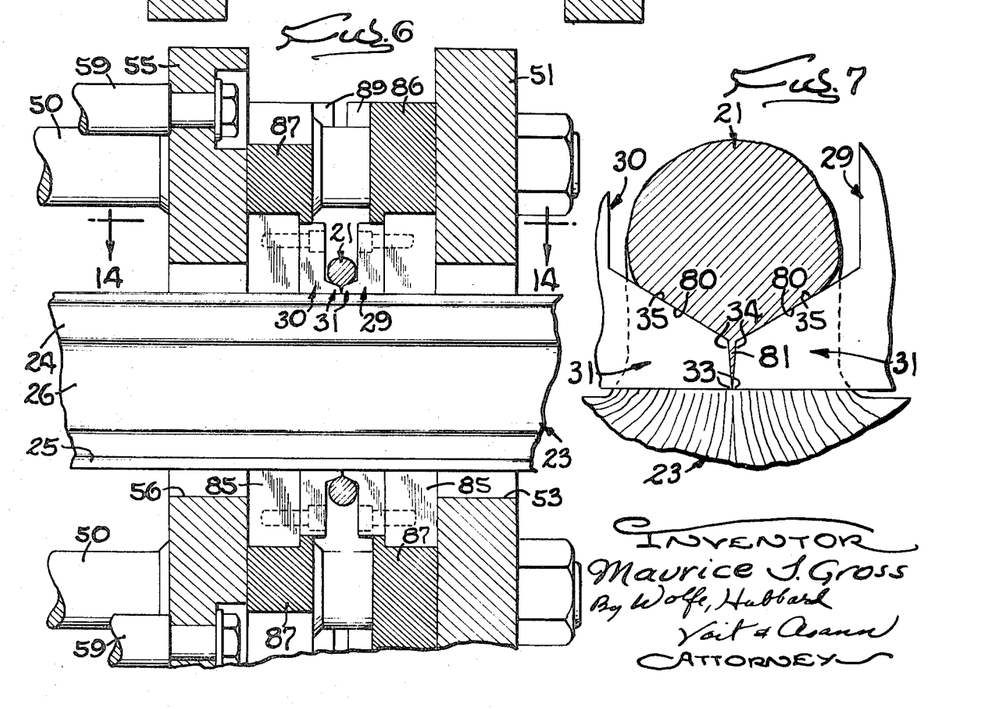
FIG. 6 is a view similar to FIG. 5 but showing both combined die and shearing members in moved positions.
FIG. 7 is an enlarged fragmentary view of the bead and the die and shearing members shown in FIG. 6.
Figure 10:
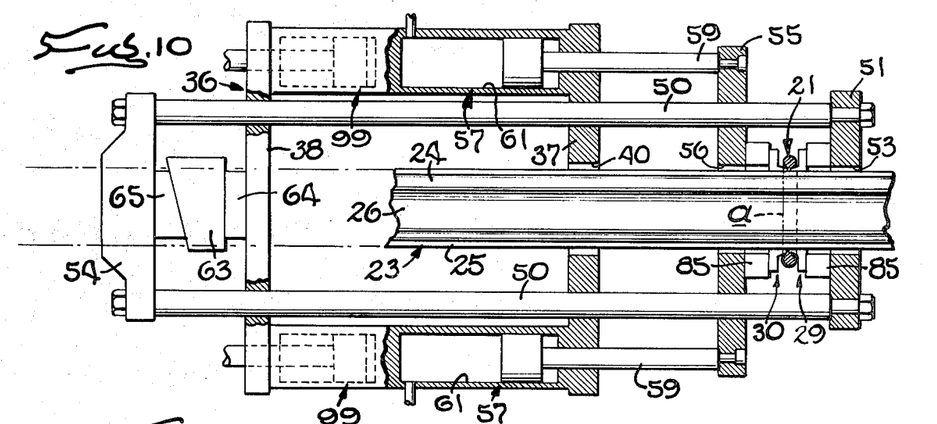
FIG. 10 is a diagrammatic view of part of the machine and showing the bead being deformed.

As the pressure continues to increase in the cylinders 61 and when the forces exerted on the bead 21 by the front and rear dies 29 and 30 become substantially equal, the rear dies shift forwardly and the front dies simultaneously shift rearwardly to pinch the bead between the dies and to force the two rail sections together endwise under a compressive pressure as high as 15 tons per square inch (see FIGS. 6, 7 and 10). As the dies pinch the bead, the shearing edges 33 cut part of the inner portion of the bead away from the rail while the deforming surface 34 simultaneously squeeze and deform the metal at the inner portion of the bead such that the metal flows outwardly across the relief surfaces 35 to form the bead with inwardly facing shoulders 80 (FIG. 7) and to leave the bead attached to the rail by only an area of reduced cross section in the form of a narrow fin 81 located adjacent the rail. Thus, the bead is deformed and reduced in cross section by the compressive forces applied by the dies, and the welded joint is not subjected to a unidirectional shearing force of large magnitude that would tend to crack open the weld. Quite the contrary, the compressive forces exerted on the rail by the dies help establish a good pressure bond between the metal around the weaker outer zone of the weld by causing the metal in the outer zone to flow generally in the pattern illustrated in FIG. 7. Thus, the forces applied by the dies eliminate or reduce any defects or flaws existing in the outer zone as the result of insufficient pressure being exerted against the heated flowable metal during the original welding operation.

Deformation of the bead 21 and shifting of the front and rear dies 29 and 30 toward one another continues until the deforming surfaces 34 of the dies meet approximately at the center of the bead with the narrow fin 81 sandwiched between the surfaces and attached to the rail 23 (see FIGS. 6, 7 and 10). Thereafter, the front dies are released from pressing engagement with the bead, and the front and rear dies are shifted forwardly in unison to cause the rear dies to move past and shear through the fin to cut the entire bead away from the rail and to push the bead forwardly from its original location a at the joint (see FIG. 11). To achieve the foregoing, the carriage 36 first is clamped securely to and locked rigidly with the rail to prevent any forward movement of the carriage relative to the rail and the overhead I-beam 41. Thereafter, the wedges 63 are pulled upwardly to their uncoupling positions (FIG. 11) to release the block 54, the bars 50, the forward die support 51 and the front dies 29 for forward movement relative to the carriage. Accordingly, the pressure in the cylinders 61 becomes effective to extend the piston rods 59 to shift the rear dies 30 forwardly thereby to cause the shearing edges 33 of the rear dies to shear through the fin 81 to cut a the bead away from the rail. Since only the fin of narrow cross section need be sheared from the rail, the shearing forces applied to the welded joint are much smaller in magnitude than would be the case if the bead were removed in its original, undeformed state by a pure shearing operation.

Figure 11:
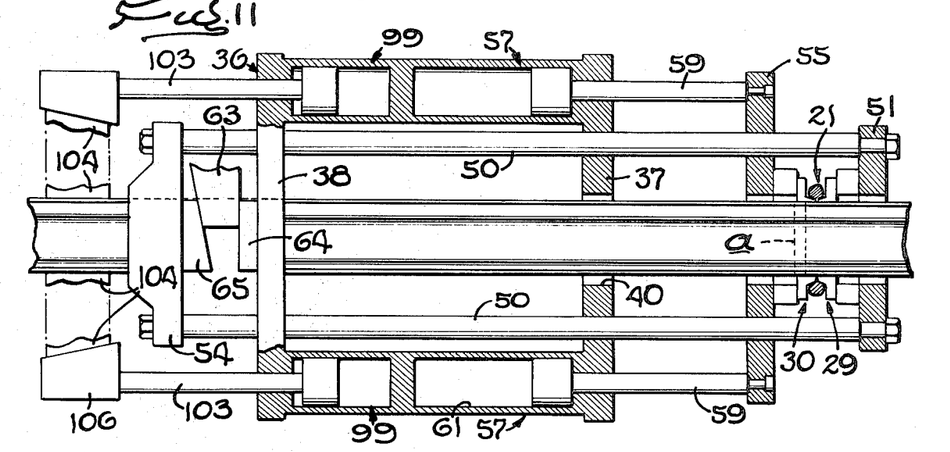
FIG. 11 is a diagrammatic view similar to FIG. 10 and showing the bead being sheared away from the rail.
Figure 12:
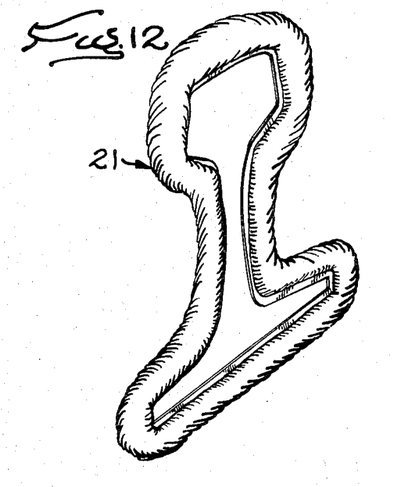
FIG. 12 is a perspective view of the bead before the latter is torn into pieces and pulled off of the rail.

As the rear dies 30 shift forwardly and shear through the fin 81, the detached bead 21 is pushed forwardly along the rail and away from the joint a and in turn pushes the front dies 29 forwardly along the rail and relative to the carriage 36 as shown in FIG. 11, the front dies being capable of such movement by virtue of the wedges 63 being in their uncoupling positions. At this time, the bead 21, although sheared away from the rail, is in the form of a continuous and unbroken collar (see FIG. 12) which remains loosely encircled around the rail.

Figure 13:
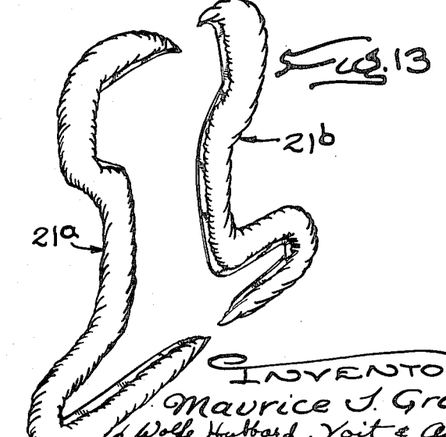
FIG. 13 is a perspective view of the bead after the latter has been torn into pieces.

In another of its aspects, the invention contemplates utilizing the dies 29 and 30 for automatically tearing the detached collarlike bead 21 into two or more pieces 21a and 21b (FIG. 13) and for pulling the pieces away from the rail 23 to avoid the need for manually performing these tasks. To these ends, the dies are retractible laterally of the rail and, as the dies are retracted, the edge portions 31 of the dies hook under the inwardly facing shoulders 80 on the bead and pull the latter apart.

Figure 14:
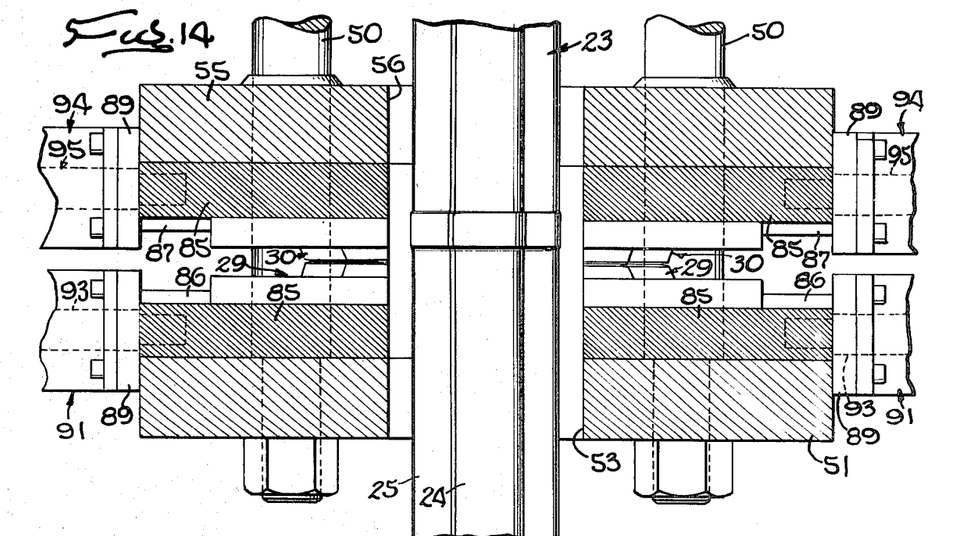
FIG. 14 is a fragmentary cross section taken substantially along the line 14-14 of FIG. 6 and showing the die and shearing members in moved positions.

Each die 29, 30 is mounted for retraction away from the rail 23 on an individual die holder 85 (FIGS. 3 and 5) which is fastened rigidly to its respective die. The die holders of the front dies are guided for transverse sliding by upper and lower flanged members 86 (FIG. 5) fastened to the forward die support 51 while the die holders of the rear dies are similarly guided by a second set of flanged members 87 on the rear die support 55. Connected between the ends of the guide members of each set are upright plates 89 (FIG. 3) which slidably receive horizontal guide rods 90 attached to the die holders. Hydraulic actuators 91 (FIGS. 14 and 18) with reciprocating piston rods 93 are connected between the front die holders and the associated plates 89 and are operable to shift the front dies laterally into and out of engagement with the rail. Identical actuators 94 (FIGS. 3, 14 and 18) with the piston rods 95 are connected between the rear die holders and rear plates 89 for shifting the rear dies laterally of the rail.

With the foregoing arrangement, the actuators 91 and 94 may be energized to retract the piston rods 93 and 95 and to pull the dies 29 and 30 away from the rail (see FIG. 14 and the phantom illustration in FIG. 3) after the fin 81 has been sheared and while the dies of both sets are still positioned in engagement with the bead 21 as shown in FIG. 11. The edge portions 31 of the retracting dies engage the inwardly facing shoulders 80 formed as an incident to deformation of the bead and, with continued retraction of the dies, tear the bead apart at approximately its upper and lower midpoints thereby to separate the bead into the two pieces 21a and 21b which are pulled away from the rail with the dies and permitted to fall to the ground. Thus, the hot bead does not have to be removed manually from the rail. Being retractible, the dies also may be pulled out of engagement with the rail 23 as the latter is fed through the machine 20 thereby to avoid possible damage to the dies and to allow unrestricted feeding of the rail.

As pointed out above, the carriage 36 is clamped securely to the rail 23 and is locked against movement relative to the latter when the rear dies 30 are shifted forwardly to shear through the fin 81. Novel means are provided for effecting clamping of the carriage to the rail in such a manner as to avoid the exertion of bending stresses on the carriage when the rear dies engage and shear through the fin. Herein, these means comprise upper and lower clamps 97 (FIG. 4) adapted to be shifted into clamping engagement with the upper and lower sides of the rail by clamp actuators 99 which are mounted on the carriage directly in line with the die actuators 57. With the two sets of actuators 57 and 99 aligned with one another, the forces exerted on the carriage by the die actuators are directly counteracted by those exerted by the clamp actuators so as to avoid the application of bending moments to the carriage.

Figure 15:
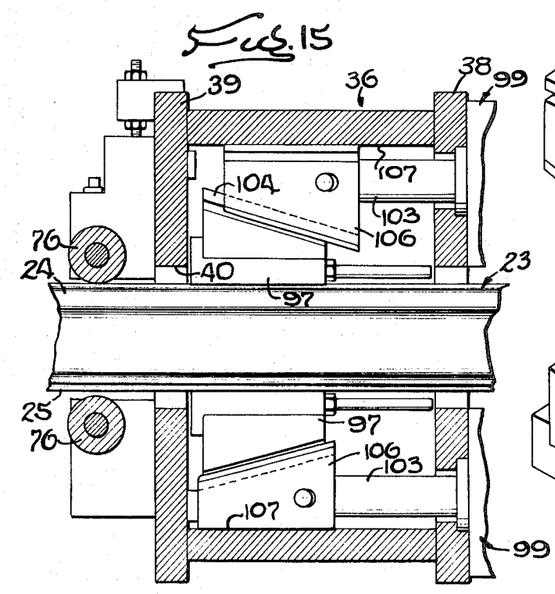
FIG. 15 is a fragmentary side elevation of a clamping mechanism for holding the rail while the bead is being sheared.
Figure 16:
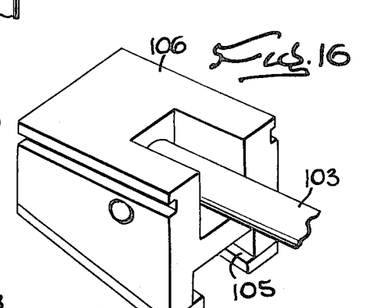
FIG. 16 is a fragmentary perspective view of part of an actuator for operating the clamping mechanism.
Figure 17:
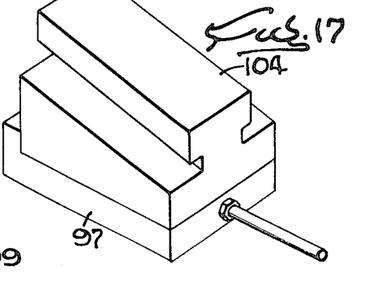
FIG. 17 is a perspective view of one of the clamps of the clamping mechanism.

In this instance, the clamp actuators 99 comprise cylinders 100 (FIG. 4) disposed end-to-end with the cylinders 61 of the die actuators 57 and anchored at their rear ends to the carriage plate 38. In response to the admission of pressure fluid alternately into opposite ends of the cylinders, pistons 101 with attached rods 103 are extended and retracted to shift the clamps 97 into and out of engagement with the rail 23. As shown in FIGS. 15 to 17, each clamp is in the form of a wedgelike block having an inclined side with a T-shaped tongue 104 which fits slidably into a complementary shaped groove 105 formed in a correspondingly inclined side of an actuating wedge 106. The actuating wedges are connected to the ends of the piston rods 103 and, as an incident to extension of the rods, are shifted rearwardly to force the clamps 97 inwardly into clamping engagement with the top and bottom of the rail. The actuating wedges slide along and are backed by walls 107 (FIG. 15) connected between the carriage plates 38 and 39 and thus are prevented from moving laterally relative to the rail. When the piston rods 103 are retracted, the actuating wedges 106 are slid forwardly to release the pressure on the clamps and to allow free relative movement between the carriage 36 and the rail.

In addition to locking the carriage 36 against movement along the rail 23, the clamps 97 also hold the rail securely and prevent longitudinal movement of the rail as the rear dies 30 shear through the fin 81. It will be apparent that, due to the in-line relation between the actuators 57 and 99, the carriage 36 is comparatively free of bending stresses when the actuators are energized concurrently to cause shearing of the bead and clamping of the rail.

Figure 18:
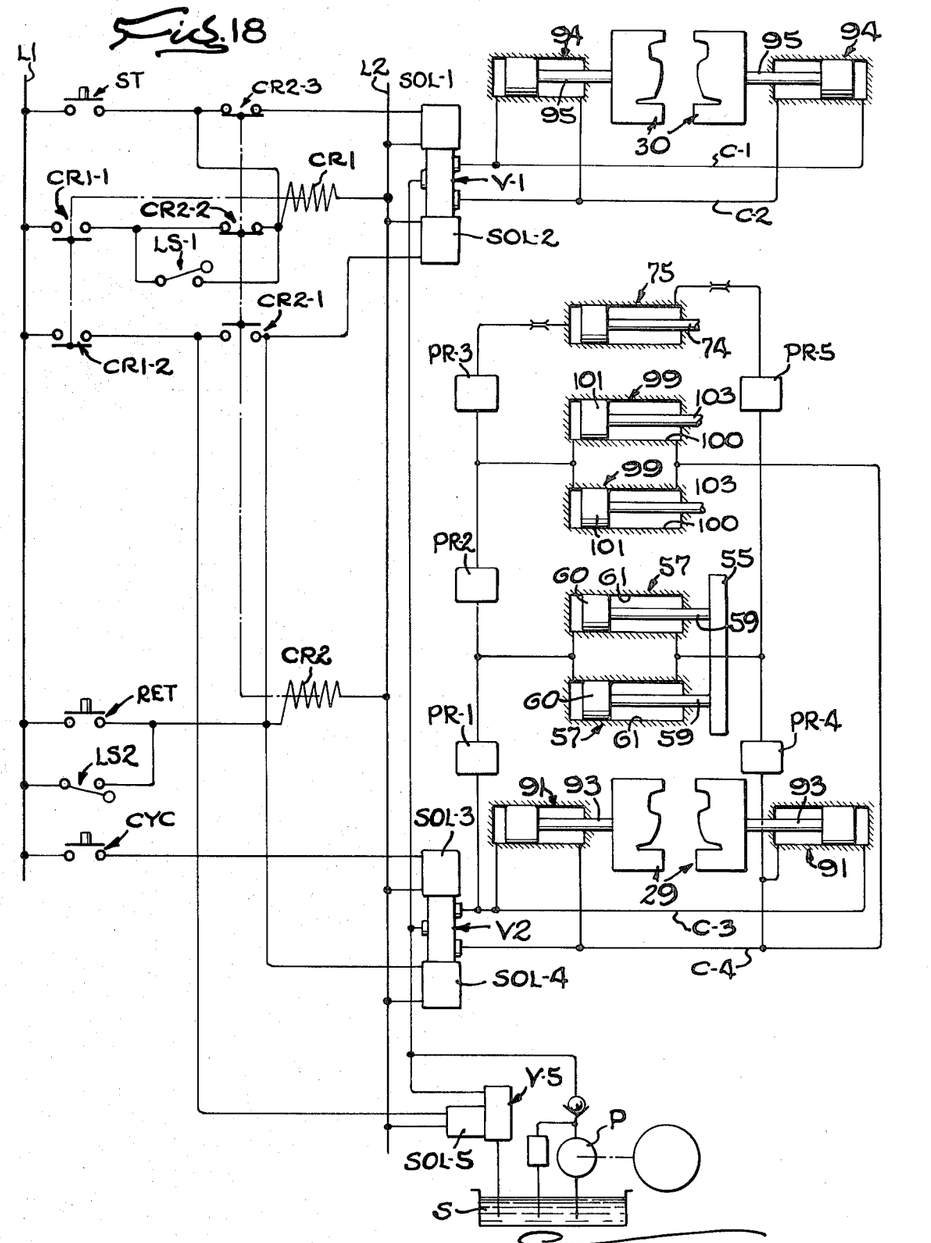
FIG. 18 is a diagram of hydraulic and electric circuits for controlling operation of the machine.

The machine 20 is adapted to be operated automatically through cycles in which the bead 21 is deformed, sheared and torn, and exemplary hydraulic and electrical circuits for controlling the automatic cycling are shown in FIG. 18. Pressure fluid is delivered to the various hydraulic actuators from a sump S by a motor-driven pump P and is controlled by a pair of four-way valves V-1 and V-2. Momentary energization of a solenoid SOL-1 shifts the valve V-1 to deliver fluid through a conduit C-1 while momentary energization of a solenoid SOL-2 shifts the valve to deliver fluid through a conduit C-2. The valve V-2 is shifted to deliver fluid through a conduit C-3 when a solenoid SOL-3 is energized momentarily and through a conduit C-4 when a solenoid SOL-4 is energized momentarily. The solenoids are connected across conventional electrical power lines L-1 and L-2 as are other electrical control elements to be described below.

Let it be assumed initially that the front and rear dies 29 and 30 are retracted laterally away from the rail 23, that the piston rods 59 of the die actuators 57 are retracted, that the wedges 63 are disposed in their coupling positions (FIGS. 8 and 10) and the clamps 97 are released from the rail. The rail is fed rearwardly through the machine 20 through the various openings 40, 53 and 56 and, when the bead 21 approaches the rear dies 30, a manually operable start switch ST (FIG. 18) is closed to energize a relay CR1. The relay seals itself in independently of the start switch by picking up its contacts CR1-1 and also picks up contacts CR1-2 to energize a solenoid SOL-5. The latter shifts an unloading valve V-5 to a position permitting the flow of pressure fluid from the pump P to the four-way valves V-1 and V-2.

Closure of the start switch ST also energizes the solenoid SOL-1 to shift the valve V-1 to a position admitting pressure fluid through the conduit C-1 to extend the piston rods 95 of the lateral actuators 94 thereby to shift the rear dies 30 laterally into engagement with the rail 23. Rearward feeding of the rail is continued until the leading face of the bead 21 (in relation to the direction of feeding of the rail) is positioned next to or in engagement with the rear dies (see FIG. 4).

Thereafter, a manually operable cycle switch CYC (FIG. 18) is closed momentarily to energize the solenoid SOL-3 of the valve V-2 to cause shifting of the latter to a position permitting the flow of pressure fluid through the conduit C-3. The pressure fluid first flows to the lateral actuators 91 of the front dies 29 and extends the piston rods 93 of such actuators to shift the front dies laterally into engagement with the rail 23. As the front dies engage the rail causing the pressure to increase in actuators 91 and the conduit C-3, a pressure relief valve PR-1 opens automatically to admit fluid into the head ends of the cylinders 61 of the die actuators 57 to extend the piston rods 59.

Upon extension of the piston rods 59, the rear dies 30 are shifted forwardly relative to the carriage 36 and into pressing engagement with the bead 21 (see FIG. 5) and, when the rear dies stop against the bead, continued extension of the rods causes the carriage and trolley 43 to move rearwardly along the overhead I-beam 41. Since the wedges 63 are disposed in their coupling positions to lock the block 54 for movement with the carriage, the front dies 29 are shifted rearwardly into engagement with the front face of the bead. When the forces exerted on the bead by the front and rear dies become approximately equal, continued extension of the piston rods 59 shifts the rear dies forwardly and simultaneously shifts the front dies rearwardly (see FIGS. 6, 7 and 10) to deform the bead and to apply a compressive force to the two sections of the rail 23.

Shifting of the front and rear dies 29 and 30 toward one another continues until the deforming surfaces 34 are stopped by one another and the fin 81 at approximately the center of the bead 21. The pressure in the cylinders 61 of the die actuators 57 then build up to cause opening of a pressure relief valve PR-2 (FIG. 18) and to permit pressure fluid to flow to the clamp actuators 99. As a result, the piston rods 103 are extended to force the clamps 97 into clamping engagement with the rail 23 and to lock the carriage 36 against movement along the rail.

With an increase in pressure in the clamp actuators 99 after the clamps 97 engage the rail 23, a pressure relief valve PR-3 opens automatically to admit pressure fluid into the wedge actuator 75 to extend the piston rod 74. The wedges 63 thus are shifted upwardly to their uncoupling positions (FIG. 11) to permit the block 54 and the front dies 30 to move relative to the carriage 36. Accordingly, continued extension of the piston rods 59 of the die actuators 57 shifts the rear dies 30 forwardly relative to the carriage to a cause the rear dies to shear through the fin 81 and to cut the bead 21 away from the rail. The rear dies push the detached bead forwardly along the rail, and the front dies, while remaining loosely engaged with the bead, are pushed forwardly by the latter and shift forwardly relative to the carriage (see FIG. 11).

As the wedges 63 start shifting upwardly from their coupling positions, an operating arm 120 (FIG. 1) carried by one of the clevices 69 moves away from and permits closing of a normally open limit switch LS-1 (FIGS. 1 and 18) for purposes of subsequently sealing in the relay CR1. When the wedges reach their uncoupling positions the operating arm 120 closes a normally open limit switch LS-2 (FIGS. 1 and 18). Closure of the limit switch LS-2 energizes a relay CR2 which picks up its normally open contacts CR2-1 and drops out its normally closed contacts CR2-2 and CR2-3. When the contacts CR2-1 are closed, the solenoid SOL-2 of the valve V-1 is energized to dump the pressure fluid in the conduit C-1 and to admit pressure fluid into the conduit C-2 and, in addition, the solenoid SOL-4 of the valve V-2 is energized to dump the pressure fluid in the conduit C-3 and to admit pressure fluid into the conduit C-4. Opening of the contacts CR2-3 deenergizes the solenoid SOL-1 to permit shifting of the valve V-1 by the solenoid SOL-2. Contacts CR2-2 open idly, but the relay CR1 remains energized through its contacts CR1-1 and through the closed limit switch LS-1.

Pressure fluid admitted into the conduit C-4 causes retraction of the piston rods 103 of the clamp actuators 99 thereby to unclamp the carriage 36 from the rail 23. Also, pressure fluid flowing in the conduits C-2 and C-4 retracts the piston rods 93 and 95 of the lateral actuators 91 and 94 to retract the front and rear dies 29 and 30 laterally away from the rail. In retracting, the dies tear the bead 21 into the pieces 21a and 21b to effect automatic removal of the bead from the rail.

When the front dies 29 reach their retracted positions causing a pressure buildup in the actuators 91, a pressure relief valve PR-4 opens to admit pressure fluid into the rod ends of the cylinders 61 of the die actuators 57. Thus, the piston rods 59 are retracted to shift the rear dies 30 rearwardly preparatory to the next cycle operation. Thereafter, pressure increases in the cylinders 61 to open a pressure relief valve PR-5 and admit pressure fluid into the wedge actuator 75 to retract the piston rod 74 and shift the wedges 63 downwardly to their coupling positions. The downwardly moving wedges force the block 54 forwardly relative to the rear carriage plate 39 to shift the front dies 29 forwardly and thereby establish the original spacing between the front and rear dies.

As the wedges 63 shift downwardly to their coupling positions, the operating arm 120 permits limit switch LS-2 to open idly preparatory to the next operating cycle. The relay CR2 remains energized, however, through its closed contacts CR2-1. When the wedges reach their coupling positions, the operating arm opens limit switch LS-1. As a result, relay CR1 is deenergized and drops out its contacts CR1-1 and CR1-2. Opening of the contacts CR1-2 deenergizes relay CR2 which picks up its contacts CR2-2 and CR2-3 and drops out its contacts CR2-1. Also, opening of the contacts CR1-2 deenergizes the solenoids SOL-2 and SOL-4 and deenergizes the solenoid SOL-5 to cause shifting of the unloading valve V-5 to a condition in which pressure fluid from the pump P is returned directly to the sump S through the unloading valve. One cycle of operation of the machine thus is completed.

If the operator of the machine 20 a should find it necessary to return the dies 29 and 30 to their starting positions at any time during the active stage of an operating cycle, a manually operable return switch RET may be closed and held closed to interrupt the automatic operation. Closure of the return switch energizes the solenoids SOL-2 and SOL-3 and the relay CR2 to effect immediate operation of the machine through the return stage of its cycle.

From the foregoing, it will be apparent that the present invention brings to the art a new and improved machine capable of removing the bead from welded railway rails without damaging the weld at the joint. The machine is comparatively fast in operation and significantly reduces the number of manual operations necessary to provide a smooth joint between the rail sections.

I claim as my invention:

1. In a machine for facilitating the removal of an external bead formed at the joint of two sections of railway rail welded end-to-end, the combination of, a support, first and second dies located on said support along one side of the rail on opposite end faces of the bead and each mounted for bodily movement lengthwise of the rail, and means connected to said dies for moving the latter simultaneously toward one another and into pressing engagement with opposite end faces of said bead thereby to deform the bead between the dies and reduce the cross-sectional dimension of the bead adjacent the joint while forcing both sections of the rail toward one another to apply a compressive force to the joint.

2. A machine usable in the removal of a external bead formed around the joint of two sections of railway rail welded end-to-end, said machine comprising a support, at least two sets of dies on said support with one set engageable with one side of the rail and with the other set engageable with the opposite side of the rail, each set comprising front and rear dies positionable on opposite end faces of the bead and mounted for bodily movement toward and away from one another lengthwise of the rail, said dies each having edge portions shaped in accordance with the profile of the rail with the edge portions of the corresponding dies of the two sets extending around the periphery of the rail when the dies are positioned in engagement therewith, and means connected to said dies for simultaneously moving the front and rear dies of each set bodily toward one another lengthwise of the rail to force said edge portions into pressing engagement with opposite end faces of the bead thereby to deform the bead between the dies and to reduce the cross section of the bead adjacent the joint while forcing both sections of the rail toward one another to apply a compressive force to the joint.

3. A machine as defined in claim 2 in which the edge portion of the rear die of each set is formed with a shearing edge, said machine further including means operable after deformation of the bead for releasing the front dies of each set from pressing engagement with the bead and for causing the front and rear dies of each set to move forwardly in unison along the rail to force the shearing edges of the rear dies through the area of reduced cross section and thereby shear the bead from the rail.

4. A machine as defined in claim 3 in which the edge portions of the dies, in deforming the bead, form inwardly facing shoulders on opposite end faces of the bead and overlying said edge portions, a said machine further including means mounting said dies on said support for lateral movement toward and away from the sides of the rail, and means operable after shearing of the bead to move said dies away from the sides of the rail thereby to shift said edge portions outwardly into engagement with said shoulders to pull the sheared bead away from the rail and to tear the portion of the bead sheared by the rear die of one set away from the portion of the bead sheared by the rear die of the other set.

5. A machine as defined in claim 3 further including means for clamping said support securely to the rail after deformation of the bead and before forward movement of the dies in unison along the rail.

6. In a machine for removing an external bead formed at the joint of two sections of railway rail welded together end-to-end, the combination of, a support, a die member and a combined die and shearing member located on said support along one side of the rail on opposite end faces of the bead and mounted for bodily movement toward and away from one another lengthwise of the rail, means connected to said members for moving the latter simultaneously toward one another and into pressing engagement with opposite end faces of the bead to deform the bead between the members and reduce the cross section of the bead adjacent the joint while forcing both sections of the rail toward one another to apply a compressive force to the joint, and means operable thereafter for releasing the die member from pressing engagement with the bead and for causing the combined die and shearing member to move lengthwise along the rail and through the area of reduced cross section to shear the bead from the rail.

7. A machine as defined in claim 6 in which each of said members is formed with a generally flat face and with an edge portion projecting from said face toward the bead and shaped in accordance with the profile of the rail, each edge portion comprising a shearing edge positionable alongside the rail, a deforming surface extending outwardly from said shearing edge, and an outer relief surface inclined outwardly from the deforming surface and toward the face of the member.

8. In a machine for removing an external bead formed around the joint of two sections of railway rail welded together end-to-end, the combination of, a support, a front die member and a rear combined die and shearing member mounted on said support (a) for movement laterally of the rail and into and out of engagement with one side of the rail on opposite end faces of said bead and (b) for movement toward and away from one another lengthwise of the rail, means connected to said members for moving the latter laterally into engagement with said one side of the rail, means connected to said members for moving the members simultaneously toward one another lengthwise of the rail and into pressing engagement with opposite end faces of the bead to deform the bead between the members and reduce the cross section of the bead adjacent the joint while forcing both sections of the rail toward one another to apply a compressive force to the joint, means for causing the members to move forwardly in unison along the rail to force the combined die and shearing member through the area of reduced cross section and thereby shear at least part of the bead from the rail, and means for moving the members laterally out of engagement with the rail while the members are positioned in engagement with the bead, whereby the members pull the sheared bead away from the rail and tear the sheared bead away from any portion of the bead unsheared by the combined die and shearing member.

9. In a machine for cutting away an external bead formed at the joint of two sections of railway rail welded end-to-end, the combination of, a main support, a carriage mounted on said main support for movement lengthwise of the rail, a front die support mounted on said carriage for movement lengthwise of the rail relative to said carriage, a rear die support mounted on said carriage for movement lengthwise of the rail relative to said carriage and to said front die support, front and rear dies disposed along one side of the rail on opposite end faces of the bead and mounted for movement with said front and rear die supports, respectively, an operator connected between said carriage and said rear die support and operable when actuated to move the rear die support forwardly to shift the rear die into engagement with the bead, means locking said carriage said s front die support against relative movement whereby continued actuation of said operator after engagement of said rear die with said bead causes said carriage and said front die support to shift rearwardly in unison relative to said main support and thereby move the front die into engagement with the bead to deform the latter between the dies, and means operable after deformation of the bead to disable said locking means operable whereby continued actuation of said operator shifts the front and rear die supports forwardly in unison relative to the carriage to cause the rear die to shear the deformed bead from the rail.

10. A machine as defined in claim 9 further including clamping mechanism mounted on said carriage and movable into and out of clamping engagement with the rail, and an operator connected between said carriage and said clamping mechanism and operable after deformation of the bead and before disablement of the locking means to shift the clamping mechanism into clamping engagement with the rail thereby to hold the latter and to prevent movement of the carriage along the rail.

11. A machine as defined in claim 10 in which each of said operators comprises a cylinder with a piston rod reciprocable back and forth relative to the cylinder in response to the admission of pressure fluid alternately into opposite ends of the cylinder, said cylinders being connected to said carriage and being aligned vertically and horizontally with one another.

12. A machine defined in claim 9 in which said main support comprises an overhead track disposed above said carriage, and a trolley movable along said track and connected to said carriage to mount the latter for movement lengthwise of the rail.

13. A machine as defined in claim 12 further including means suspending said carriage from said trolley and mounting the carriage for lateral and vertical floating relative to the rail.

14. A machine as defined in claim 9 in which said operator comprises a cylinder connected to said carriage and having a piston rod reciprocable back and forth within the cylinder in response to the admission of pressure fluid alternately into opposite ends of the cylinder, said piston rod being connected to said rear die support to move the latter and being slidably guided in said front die support, a series of bars connected to said front die support and slidably guided in said rear die support and said carriage, and said locking means comprising a member operable to couple and uncouple said bars and said carriage to respectively prevent and permit sliding of the bars relative to the carriage.

15. In a machine for cutting away an external bead formed at the joint of two sections of railway rail welded end-to-end, the combination of, a main support, a front die support mounted on said main support for movement relative to the latter and lengthwise of the rail, a rear die support mounted on said main support for movement lengthwise of the rail relative to said main support and said front die support, front and rear dies disposed along one side of the rail on opposite end faces of the bead and mounted for movement with said front and rear die supports, respectively, an operator connected between said die supports and operable to shift the latter in opposite directions relative to said main support thereby to shift said dies toward one another and into pressing engagement with opposite end faces of the bead to deform the bead, and means operable after deformation of the bead to cause said die supports to shift forwardly in unison relative to said main support thereby to move the rear die past the deformed bead to shear the latter from the rail.

16. In a machine for cutting away an external bead formed at the joint of two sections of railway rail welded end-to-end, the combination of, a support defining a passage for the rail, a pair of shearing blades engageable with opposite sides of the rail and mounted on said support for movement lengthwise of the rail and across said bead through forward and return strokes, a blade actuator connected between said support and said blades and operable to exert a force in one direction along the rail to move the blades through said forward strokes to shear away said bead, a pair of clamps disposed on opposite sides of said rail and mounted on said support for movement into and out of clamping engagement with the rail, a clamp actuator connected between said support and said clamps and operable to exert a force in the opposite direction along the rail to move the clamps into clamping engagement with the rail, and said actuators being aligned horizontally and vertically with one another on said support, whereby the force exerted on the support by one actuator is counteracted by the force exerted on the support by the other actuator and without the application of bending forces to the support.

17. A machine as defined in claim 16 in which each of said actuators comprises a cylinder with a piston rod reciprocable back and forth relative to the cylinder in response to the admission of pressure fluid alternately into opposite ends of the cylinder, said cylinders being mounted on said support and being disposed end-to-end with said piston rods extending in opposite directions along the rail.